United States Patent [19]

Cruzan et al.

[11] 4,198,777
[45] Apr. 22, 1980

[54] FISHING TACKLE BOX

[76] Inventors: Harold Cruzan, 10048 Sunnybrae Ave., Chatsworth, Calif. 91311; Charles T. Cruzan, 6723 Ben Ave., North Hollywood, Calif. 91605

[21] Appl. No.: 929,379

[22] Filed: Jul. 31, 1978

Related U.S. Application Data

[63] Continuation-in-part of Ser. No. 783,915, Apr. 1, 1977, abandoned.

[51] Int. Cl.² ............................................. A01K 97/06
[52] U.S. Cl. ................................................. 43/57.5 A
[58] Field of Search .......... 43/54.5 R, 54.5 A, 57.5 R, 43/57.5 A; 206/315, 379; 211/120, 60 T

[56] References Cited

U.S. PATENT DOCUMENTS

| | | | |
|---|---|---|---|
| 1,669,928 | 5/1928 | Case | 43/57.5 R |
| 1,999,779 | 4/1935 | Perrine | 43/57.5 R |
| 2,081,817 | 5/1937 | Johnson | 206/315 |
| 2,099,003 | 11/1937 | DeWitt | 43/57.5 R |
| 2,173,363 | 9/1939 | Hillmer | 43/57.5 R |
| 2,899,770 | 8/1959 | Bartlett | 43/57.5 R |
| 3,053,006 | 9/1962 | Horner | 43/57.5 R |
| 4,040,202 | 8/1977 | Wille | 43/57.5 A |

FOREIGN PATENT DOCUMENTS 698318 10/1953 United Kingdom ................. 43/57.5 A

*Primary Examiner*—Nicholas P. Godici
*Attorney, Agent, or Firm*—Jessup & Beecher

[57] ABSTRACT

A container for storing fishing tackle that will compactly organize a large assortment of spinners, other lures, and tackle to prevent it from becoming intermixed, tangled, spilled, or blown away while making it easy to deposit, remove, and inventory. The container has a center frame partitioned into upper and lower compartments. These compartments have partitions separating them into smaller lure containing compartments of various sizes. Both top and bottom compartments are sealed with essentially identical covers, hinged at one end or side of the frame, and engaging a latch at the opposite end or side. A number of compartments have a spring retainer and a spring for engaging the eyelet of spinners and lures. The bias force of the spring, together with a means for securing the hooks of the lures, holds the lures firmly in position. An opening in the center frame partition allows lure hooks to wrap around the partition, protruding into the coincident compartment, and be positioned by a notch in the center web opening or the coincident compartment side walls. This internesting makes for a more compact box. Each cover is constructed with a row of slots, crossed by a helical coil tension spring for storing fishing flies. Each slot guides and retains the hook of a fishing fly to hold it in a stand-up position while the coil spring squeezes the hook to prevent it from being accidentally dislodged.

7 Claims, 9 Drawing Figures

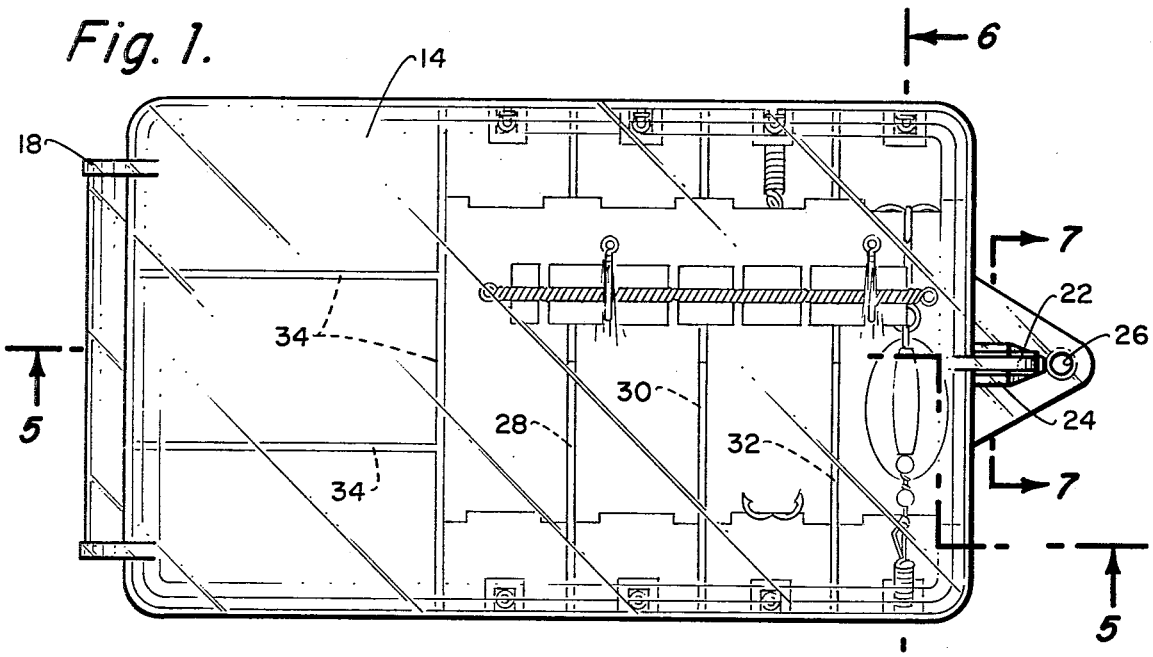
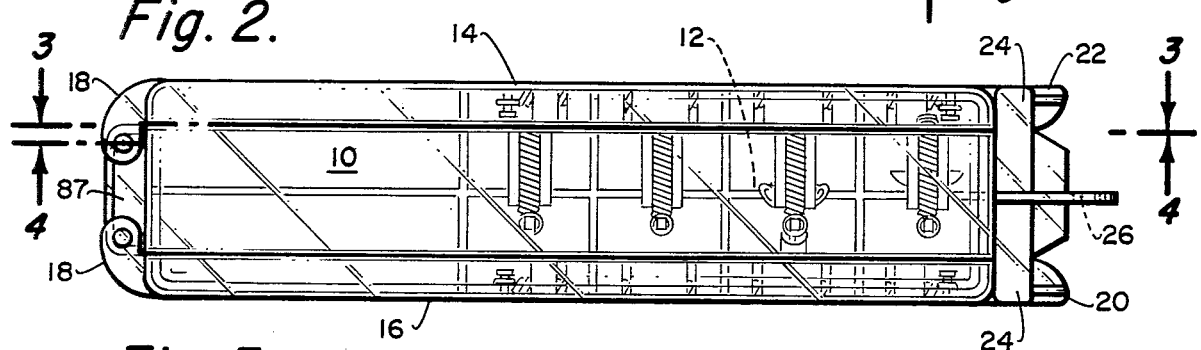
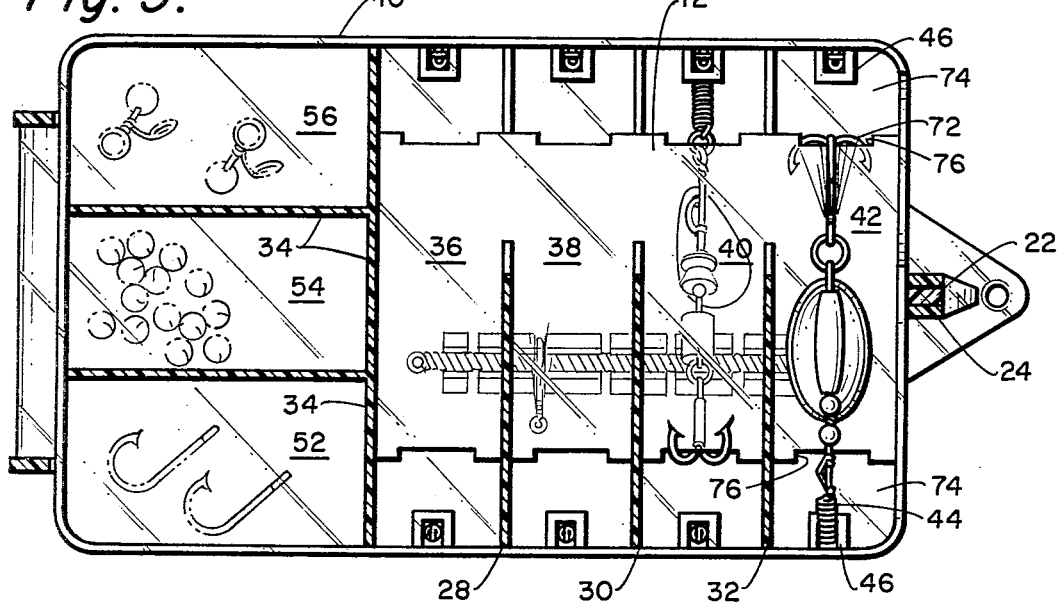

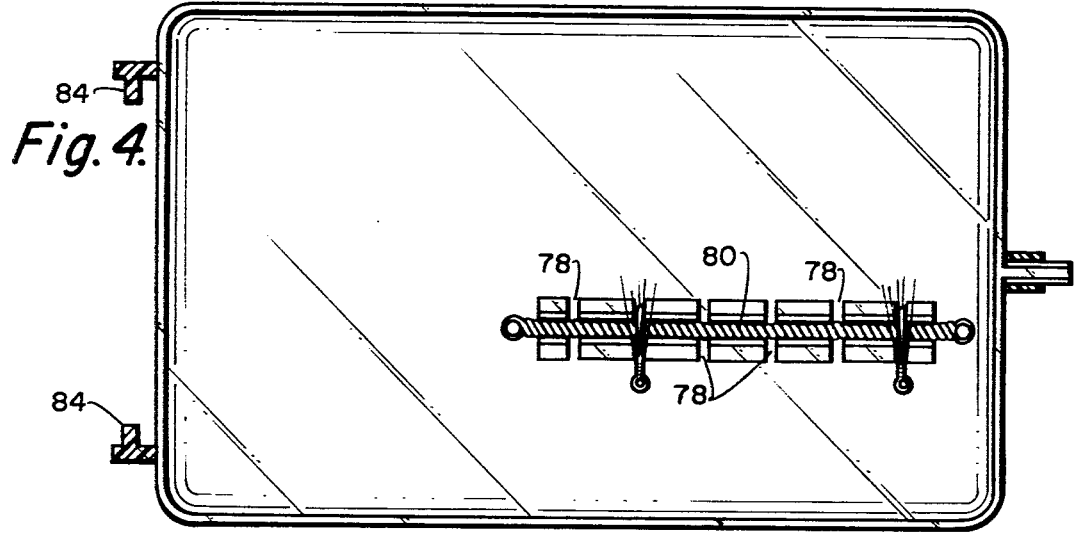
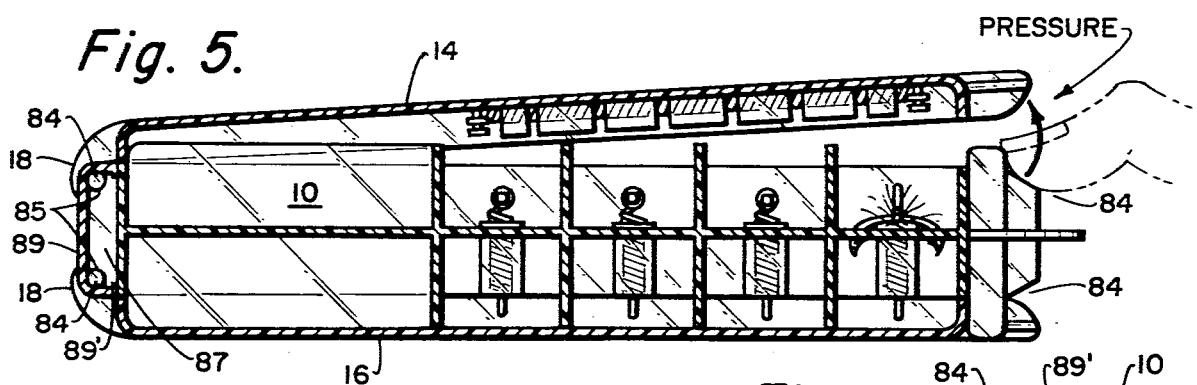
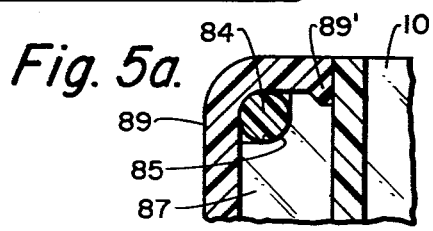
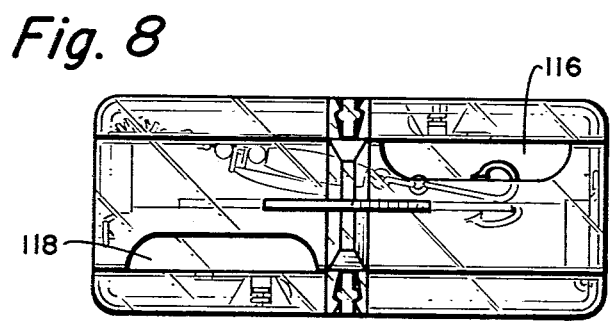
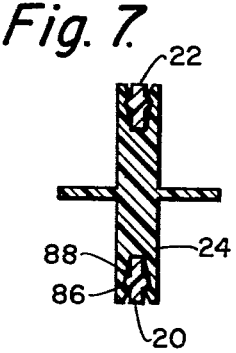
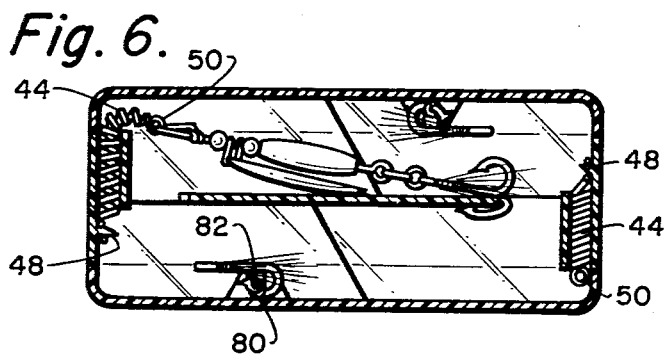

FISHING TACKLE BOX

CROSS REFERENCE TO RELATED APPLICATION

This is a continuation-in-part application of Ser. No. 783,915, filed Apr. 1, 1977 now abandoned.

BACKGROUND OF THE INVENTION

This invention relates to containers for storing fishing tackle but some features may also apply to general storage containers.

Numerous devices are available for storing fishing tackle, but in most cases consist of a box having partitions separating it into a plurality of compartments wherein the gear is loosely laid, or the boxes are suited to only one kind of tackle. Some boxes utilize various types of springs or clips to secure tackle in place; however, they are not designed to accommodate a large variety of lures and are difficult to assemble and operate.

Other problems encountered with some of these devices are:

Lures not held separately and firmly in place allow tangling.

Loose tackle can be spilled or blown out.

Inefficient use of box volume, resulting in a larger box than necessary for the same amount of tackle.

Difficulty of tackle inventory

Hard operating latches

Clumsy trays and lids

Weak hinges, some with limited opening capability.

Inability to accommodate a large variety of tackle.

In particular, a device for storing fishing flies only is usually a box having a plurality of small compartments in which the flies are loosely placed. Since most flies are very light and delicate, they can easily be crushed, fall, or be blown out. Lids over each compartment are sometimes provided, but they are clumsy to use, costly to manufacture, and increase the box size. For these reasons, it is advantageous to provide some means to securely restrain the flies in a stand-up position, and by handling the hook eyelet only, prevent damage, yet allow for easy removal and replacement. Some devices for storing fishing flies use a clip to hold the fly hook; however, smaller size hooks can fall out and few remain in a stand-up position for accessibility. Flies lying on their sides are subject to crushed feathers. Still other devices use holding features requiring handling of the fly bodies rather than the hook eyelet, resulting in crushed feathers.

SUMMARY OF THE INVENTION

The purpose of the present invention is to provide a tough, pocket-size, see-through box for storing a large assortment of fishing tackle in an organized manner, restraining the tackle from entanglement, yet allowing easy removal and replacement.

The invention consists of a box in which a center frame has a fixed partition separating the frame into upper and lower compartments. Additional fixed partitions separate these large compartments into various size smaller compartments for storage of individual lures and other tackle. A number of these compartments have spring retainers holding coil springs onto which the eyelet of lures or spinners can be hooked. A means for restraining movement of the lure or spinner hooks is provided at the opposite end of each compartment.

A spring retainer socket serves to retain the spring and also allows it to be stretched and bent at essentially a right angle so that lures of various sizes may be retained in identically sized compartments. Bending the spring at an angle makes possible a longer softer spring in a compact "at rest" position. The spring is secured at one end by a post located beneath each socket. When the spring is inserted into the socket with a downward thrust, the loop end snaps easily over the post which holds it in both "at rest" and stretched positions. The socket confines the spring to an upright position until a lure is attached, after which it guides the spring through its travel while the post anchors the loop end. The opening in the partition separating the upper and lower compartments, adjacent to the spring retainers, allows the lure hooks to wrap around the partition and internest into a coincident compartment directly beneath the compartment in use to counteract the bias force of the spring.

The tackle box also provides a means for easily and securely storing fishing flies of assorted sizes without damaging them. The storage means consists of a series of guiding slots into which the hooks of flies can be slipped. Each slot has a means for gripping the fly hook. It is comprised of a single coil spring into which each fly hook is guided, the spring being stretched sufficiently to provide a slightly pinching force of its adjacent coils on each fly hook. With this type of configuration, flies rest in a stand-up position and can be easily handled by the hook eyelet to be removed and replaced without damage, while preventing them from being accidentally dislodged.

The upper and lower compartments of the center frame are closed with covers hinged at one end or side of the center frame and engaging a latching mecanism at the opposite end or side. The fly-retaining means is located in at least one row on each cover. The latching mechanism is constructed to be easily wedged open by pushing the thumb into a V-shaped notch. It also has a means for attachment of a belt hook. The hinge is constructed so that each cover can be placed on its respective side of the center frame and a hinge clamp thereafter snapped into place. The hinge clamp surfaces form part of a semi-journal bearing by making line contact in two planes with trunnions formed as part of each cover.

The tackle box is preferably constructed of clear plastic allowing easy observation of the tackle stored therein. The arrangement of the compartments for storage in the center frame and covers provides an internesting, compact, readily usable arrangement of minimum size.

It is one object of the present invention to provide a tough, pocket-sized, see-through container for storing fishing tackle which prevents intermixing, tangling and spillage.

Another object of the present invention is to provide a system for firmly retaining and storing assorted sized fishing flies, in a stand-up position, preventing damage, yet allowing ease of insertion and removal.

Another object of the present invention is to provide a container for storing a large assortment of fishing tackle in which the storage compartments will securely retain various sized lures, flies and other tackle, arranged to internest for compactness.

Yet another object of the present invention is to provide a tackle box which has a secure cover latching mechanism that is easily opened and closed.

Another object of the present invention is to provide a tackle box which is readily assembled by snapping its components together.

Still another object of the present invention is to provide a container for storing tackle which is compact and easy to use.

Still another object of the present invention is to provide a tough, readily moldable, snap-together hinge for the container which will maintain cover alignment and allow 180° opening.

Other objects, adventages and novel features of the invention will become apparent from the following detailed description when considered in conjunction with the accompanying drawings, wherein like reference numbers identify like parts throughout.

BRIEF DESCRIPTION OF THE DRAWINGS

FIG. 1 is a top view of the tackle box.
FIG. 2 is a side view of the tackle box.
FIG. 3 is a sectional view of the tackle box taken at 3—3 of FIG. 2.
FIG. 4 is a sectional view of the tackle box taken at 4—4 of FIG. 2.
FIG. 5 is a sectional view of the tackle box taken at 5—5 of FIG. 1.
FIG. 5A is a sectional detail of the hinge.
FIG. 6 is a sectional view of the tackle box taken at 6—6 of FIG. 1.
FIG. 7 is a sectional view taken at 7—7 of FIG. 1.
FIG. 8 is an end view of the tackle box of FIG. 1.

DETAILED DESCRIPTION OF THE PREFERRED EMBODIMENT

A compact container for storing fishing tackle is shown in FIGS. 1 and 2 in which the container is comprised of a center frame 10 separated into upper and lower compartments by a partition 12, having essentially identical covers 14 and 16 for closing the container. The covers 14 and 16 are hinged at 18 and have tongues 20 and 22 engaging a latch 24. The latch 24 includes an eyelet flange 26 for attaching a belt hook or the like.

The upper and lower compartments formed by the partition 12 are likewise separated into a variety of smaller compartments by several partitions. The partitions 28, 30 and 32 separate the top and bottom into large compartments for storage or large lures. Cross-webs or partitions 34 separate a portion of the upper and lower compartments into smaller compartments for storing loose small tackle, such as sinkers, hooks, swivels, etc. The compartments 36, 38 and 40 and 42 (FIG. 3) formed by the partitions 28, 30 and 32 have a coil tension spring 44 and a spring retainer socket 46 at one end of each of the compartments. Each socket has a post 48 (FIG. 6) beneath its lower surface onto which the end loop of the spring is snapped. Each spring has a hook 50 for engaging the eyelet of various lures or spinners at its other end. The covers 14 and 16 are constructed to securely close each of these compartments 52 through 56 (FIG. 3) to prevent the loose tackle from being intermixed with the lures.

The unique feature of the tackle box is the use of the spring retainer 46 for positioning and guiding the spring throughout its travel. In each of the compartments 36 through 42 on the top and bottom of the tackle box, the spring retainer is placed on opposite ends of each compartment as shown. The partition 12 has an opening in the area 74, allowing the treble hook 72 to wrap around the partition and be secured by the notch 76 or the partitions 34, 28, 30, 32 and the center frame end wall. This internesting reduces the size of the tackle box because less space is required for the large-size treble hooks.

The design of the covers 14 and 16 is illustrated in FIG. 4. They are essentially identical to each other. A row of slots 78 is provided for securing fishing tackle known as flies. These consist of a small hook with feathers or string tied to it to simulate an insect. They are difficult to securely store because they are delicate, light and are easily crushed. The fly retainer slots are gauged to accept the fly hooks so that they may be easily slid into place and are held upright and secure. Secureness is accomplished by the squeezing action of spring 80 which is located in groove 82 (FIG. 6) extending across all slots 78. This provides for secure retention and accurate alignment, preventing the flies from accidentally being dislodged, yet allowing for easy removal and replacement by handling the eyelet of the hook only.

The box is provided with a unique latching mechanism 20, 22 and 24 (FIG. 2) which holds the covers firmly closed, yet allows them to be easily opened. The latches 20 and 22 are constructed so that they form a V-notch 84 into which the thumb can be easily pressed to wedge the cover open, as illustrated in FIG. 5. The tongue 20 (FIG. 7) has a small flange 86 which snaps into groove 88 on the latch mechanism 24.

As before, covers 14 and 16 are hinged at 18, the detail of which is shown in FIGS. 5 and 5A. The covers 14 and 16 have trunnions 84 formed as an integral part thereof. When the covers are positioned on the center frame, trunnions 84 rest in quarter circular recesses 85 formed in two ribs 87 (FIG. 5 and 5A) at one end of center frame 10. A hinge clamp 89 snaps onto the two ribs and is held in place by ears 89'. The surfaces of hinge clamp 89 then make line contact with trunnions 84, holding them securely in place while forming a semi-journal bearing within which they rotate as the covers are opened and closed.

In order to make the box pocket-size, the compartments 36, 38, 40 and 42 (FIG. 3) are sized to accommodate a vareity of popular spinner and spoon lures. For easy removal of lures from compartment 42 (FIG. 13), the side wall of the box is constructed with a curved aperture 116 and 118. This aperture serves to permit easy gripping of the lure and also functions as an air vent for evaporation of any moisture remaining on lures or flies.

Thus, there has been disclosed a combination tackle box which is compact in construction and design which prevents entangling and intermixing of lures, flies and other tackle. Lures and flies are held securely in place by springs and slots and are readily accessible. The tackle box provides a novel over-and-under internesting arrangement allowing a large assortment of tackle to be securely stored in a compact space. Transparency of the box allows easy observation of the tackle for inventory purposes. A snap latch with special thumb wedging notch permits firm closing of the box, but allows easy opening with a wedge action of the tip of the thumb. A novel hinge for snapping the covers onto the center frame with a hinge clamp provides accurate alignment, secure holding and yet allows 180 degrees opening of the covers.

Obviously many modifications and variations of the present invention are possible in light of the above teachings. Therefore it is to be understood that the full scope of the invention is not limited to the details disclosed herein and may be practiced other than as specifically described.

What is claimed is:
1. A container for storing fishing tackle comprising:
a substantially rectangular frame;
a first fixed planar partition extending across said frame and creating equal areas bordered on all sides by said frame;
a pair of covers for covering the top and bottom of said rectangular frame;
hinge means hinging said covers to said frame;
latch means opposite the hinge means for holding the covers securely closed;
a plurality of partitions perpendicular to said first partition separating equal areas into a plurality of substantially equal compartments;
socket means attached to the sides of said frame at the ends of each compartment;
post means attached to said frame adjacent to the end of each socket;
said post means being at the opposite end of the socket on the opposite sides of the frame;
a coil spring having a loop on one end and a hook on the other end installed in said socket means;
said loop passing over said post means for retaining said spring in said socket;
extension means on each socket extending towards said compartment and adapted to flex said coil spring at essentially a right angle;
means on the opposite end of said compartments for engaging the hooks of said lures;
whereby a lure may be retained by engaging the hook of said coil spring in the eyelet of said lure and bending said spring over said extension whereby said compartment may accommodate various size lures.

2. The container according to claim 1 wherein said means for engaging the hooks of said lures comprises:
cutouts in said first fixed partition at the respective ends of each compartment opposite said sockets.
3. The container according to claim 1 wherein:
said posts have an angled surface facing the opening in said socket whereby the loop of said spring may be easily cammed over said post.
4. The container according to claim 1 including:
latch means for securing said top and bottom covers in a closed position;
said latch means comprising:
a tongue;
vertically extending notches on opposite sides of said tongue;
a rounded blade extending outward from each cover and engaging the notches on said tongue; and
said blades and said tongue forming a V-shape angle whereby the thumb may easily be used as a wedge to snap open the covers.
5. The container according to claim 1 wherein said hinge means comprises:
a pair of flanges extending outward from said frame;
said flanges having quarter circle cutouts in the top and bottom outermost corners and notches at the top and bottom innermost corners;
a pair of trunnions on each cover engaging the quarter circles of the flanges; and
a C-clamp snapping over said trunnions and having a sharp ridge engaging said notch thereby hingedly securing said covers to said frame.
6. The container according to claim 1 including means for securing flies, said means comprising:
a plurality of members forming an elongate channel traversed by a plurality of slots;
a coil spring seated in said channel;
whereby the flies may be secured in an upright position by snapping the hooks thereof between the coils of said spring with each fly secured in a slot.
7. The container according to claim 6 wherein said members forming said elongate channels are formed on the interior of the respective covers.

* * * * *